United States Patent
McBride et al.

(10) Patent No.: US 8,421,816 B1
(45) Date of Patent: Apr. 16, 2013

(54) SELECTION OF COLORS

(75) Inventors: Stephen Charles McBride, Issaquah, WA (US); Vinayak R. Hegde, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 452 days.

(21) Appl. No.: 12/826,841

(22) Filed: Jun. 30, 2010

(51) Int. Cl.
*G09G 5/00* (2006.01)
*G09G 5/02* (2006.01)
*G06K 9/00* (2006.01)
*G06K 9/36* (2006.01)
*G06F 17/00* (2006.01)
*G06F 3/00* (2006.01)
*G03F 3/08* (2006.01)
*H04N 9/64* (2006.01)
*H04N 5/74* (2006.01)
*H04N 1/387* (2006.01)

(52) U.S. Cl.
USPC ........... 345/593; 345/591; 345/594; 345/600; 345/605; 345/619; 348/577; 348/708; 348/748; 358/518; 358/452; 382/167; 382/276; 715/273; 715/275; 715/700

(58) Field of Classification Search .......... 345/427–428, 345/581, 589–591, 593–594, 600–601, 605–606, 345/619–622, 156, 501, 520, 548–549; 348/253–254, 268, 571, 577–578, 708, 717, 348/742; 358/518–519, 524–525, 537, 447–448, 358/452–453; 382/162, 164, 167, 254, 274, 382/276; 715/273, 275, 700
See application file for complete search history.

(56) References Cited

U.S. PATENT DOCUMENTS

| | | | | | |
|---|---|---|---|---|---|
| 5,416,890 | A | * | 5/1995 | Beretta | 345/590 |
| H1506 | H | * | 12/1995 | Beretta | 345/591 |
| 7,518,752 | B2 | * | 4/2009 | Kress | 358/1.9 |
| 2005/0002564 | A1 | * | 1/2005 | Aliffi et al. | 382/166 |
| 2009/0116739 | A1 | * | 5/2009 | Aliffi et al. | 382/166 |

OTHER PUBLICATIONS

Microsoft Corp., Microsoft Office Word 2003, Color Selection Tool, Copyright 1983-2003.

* cited by examiner

*Primary Examiner* — Wesner Sajous
(74) *Attorney, Agent, or Firm* — Thomas | Horstemeyer, LLP

(57) ABSTRACT

Disclosed are various embodiments for facilitating the selection of colors. An initial set of colors from a color space is generated in one or more computing devices for rendering in a user interface. Each color from the color space is expressed as a respective tuple of color component values. A selection of one of the initial set of colors is obtained. A subsequent set of colors from the color space is generated for rendering in the user interface. The subsequent set of colors is determined according to values of the N most significant bits of each of the corresponding color component values of the one of the initial set of colors, where N is a predetermined positive integer that is less than a bit length of each color component value.

26 Claims, 6 Drawing Sheets

SELECTION OF COLORS

BACKGROUND

Colors may be selected for a variety of purposes. As an example, a person might select a paint color for use in painting the walls of a living room. It may be desirable for the paint color to match or coordinate with a color of furniture in the living room. As another example, a person might select a color for use in creating a graphic for a web site. In computing systems, a color is typically represented by a 24-bit value in the red, green, blue (RGB) color space, though other representations and color spaces may be used.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating the selection of colors. Various embodiments of the present disclosure employ a divide and conquer approach to obtain a selection of an initial color from a palette of colors and display another palette of colors that are related to the initial color, thereby leading to a progressively refined color choice. In one embodiment, any color in the 24-bit RGB color space containing over 16 million colors may be chosen through four or fewer selections and iterations of this approach. Due to limitations of the human eye in distinguishing similar colors, an acceptable color selection may often be achieved within two palettes of colors and two color selections. By offering multiple palettes of colors for selection through a divide and conquer approach, the display area consumed by a palette may be reduced and a better selection of color blends may be provided.

Figure 1:
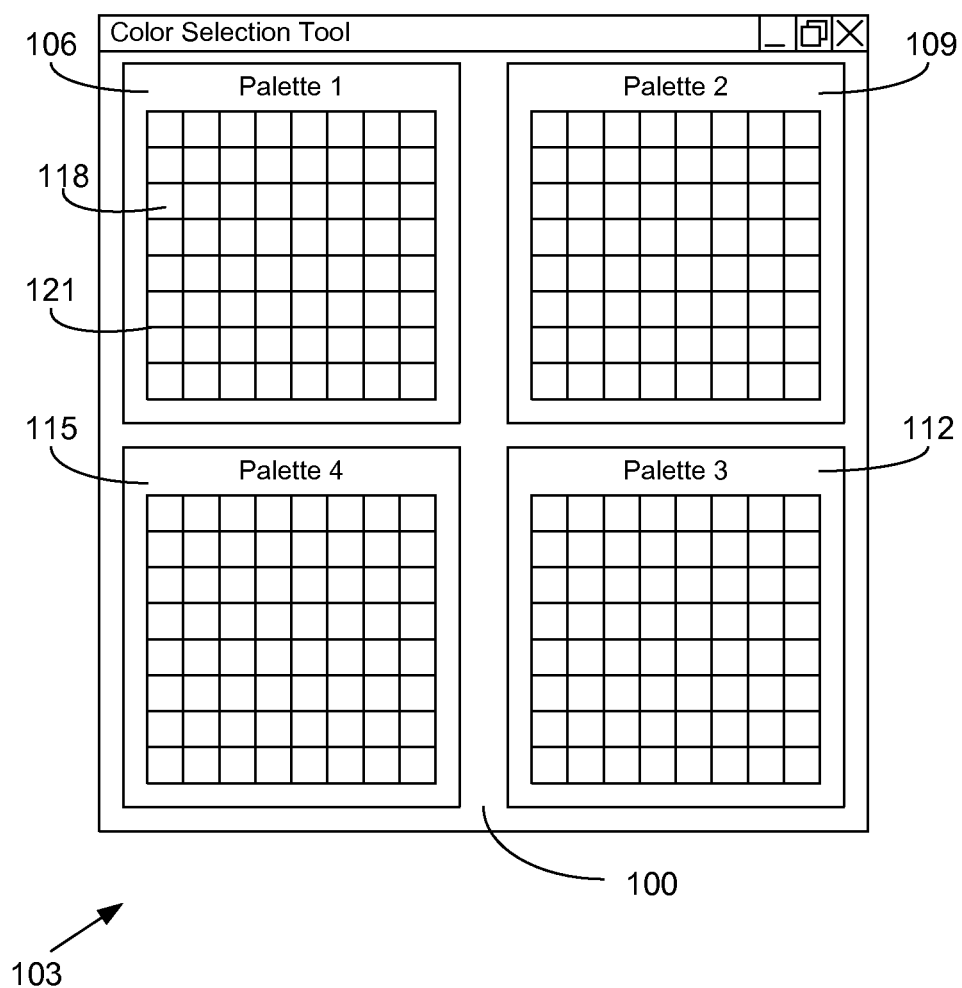
FIG. 1 is a drawing of a user interface of a color selection application according to an embodiment of the present disclosure.

With reference to FIG. 1, shown is one example of a user interface 100 generated by an embodiment of a color selection application 103 executing on one or more computing devices. The user interface 100 includes four color palettes 106, 109, 112, 115. Each of the color palettes 106, 109, 112, 115 comprises a plurality of cells 118 inside which a discrete color may be rendered. In the non-limiting example of FIG. 1, each of the color palettes 106, 109, 112, 115 comprises a grid of colors, though other arrangements of colors (e.g., spirals, triangles, honeycomb arrangements, etc.) may be used as a palette in alternative embodiments. Each of the cells 118 may be separated by an interstitial border 121. The operation of the color selection application 103 will now be described with reference to the above features.

When a user launches the color selection application 103, the user interface 100 may be rendered and displayed. In the embodiment of FIG. 1, the color selection application 103 may comprise a desktop application or applet executing in a Windows®, Macintosh®, Linux®, or other operating system environment. In one embodiment, the color selection application 103 may be a tool or functionality embedded within another application, such as, for example, an image editing application, a word processing application, a paint color selection application, or other applications.

In alternative embodiments, the color selection application 103 may comprise an application executable on one or more server computing devices which encodes one or more network pages, such as web pages, for rendering on a client computing device, for example, in a browser or other application. In some embodiments, such network pages may include code executable on the client computing device such as Javascript, dynamic hypertext markup language (DHTML), Ajax, etc., so that some or all of the functionality of the color selection application may be executed on the client computing device in the browser or other application.

When the user interface 100 is rendered, the first color palette 106 may be populated with an initial set of colors from a color space. The color space or color model may comprise, for example, the RGB color space, a hue/saturation/value (HSV) color space, a YCbCr color space, a cyan/magenta/yellow/black (CMYK) color space, or any other type of color space. The initial set of colors may, for example, be predetermined in order to provide a wide sampling of possible colors from the color space. In one embodiment, a grayscale set of colors may be used. In another embodiment, the 216-color browser-safe set of colors may be used.

Each color in the color space may be expressed as an N-tuple of component color values. Each of the component color values may be represented by a data element, such as an eight-bit octet, a floating point value, or other quantity of data. To simplify the following discussion, a 24-bit RGB color space will primarily be assumed, each of the RGB values being expressed by a respective octet. However, it is understood that the principles discussed herein may be applied to different color spaces with different data representations, including component color values of varying bit lengths.

Each of the cells 118 is used for displaying a discrete color. In the embodiment of FIG. 1, 64 cells 118 are present in each of the color palettes 106, 109, 112, 115. Other quantities of cells 118 may be present in other embodiments. In one embodiment, a number of colors rendered in each of the color palettes 106, 109, 112, 115 is given by the equation: $|C_{GRID}|=|C_{SPACE}|^{1/G}$, wherein $|C_{GRID}|$ is the number of colors rendered in each of the color palettes 106, 109, 112, 115, $|C_{SPACE}|$ is the number of colors in the color space, and G is the number of color palettes 106, 109, 112, 115. Although the color palettes 106, 109, 112, 115 are illustrated as square, in other embodiments the color palettes 106, 109, 112, 115 may be rectangular, linear, circular, hexagonal, elliptical, or any other arrangement. Although the cells 118 are illustrated as squares, in other embodiments the cells 118 may be rectangles, circles, hexagons, ellipses, or any other shape. Moreover, the cells 118 may be of non-uniform sizes and/or shapes in other embodiments.

Figure 2:
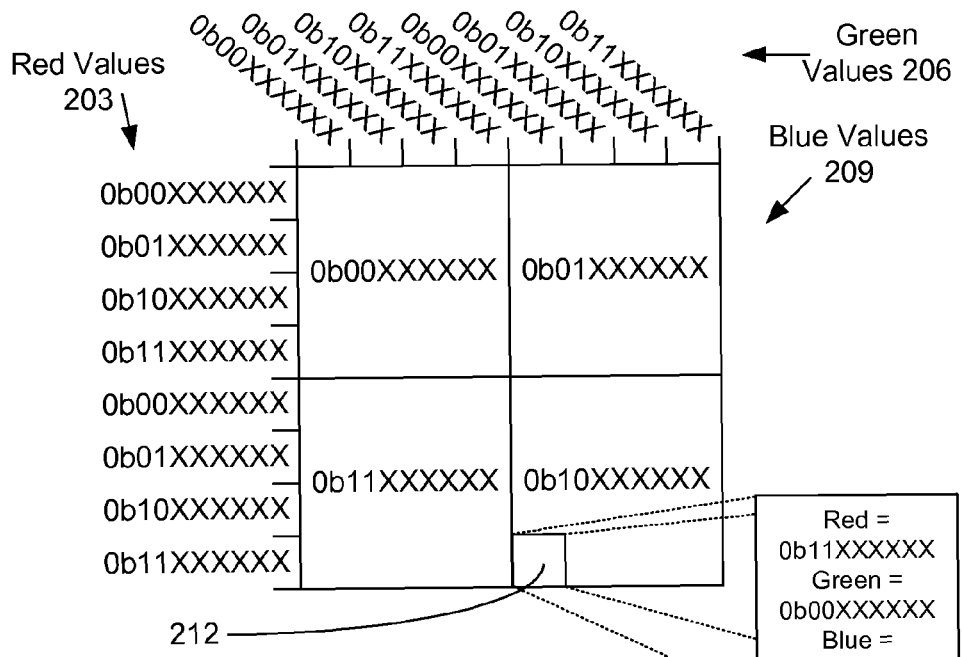
FIGS. 2 and 3 are tables illustrating example assignments of color values by the color selection application according to an embodiment of the present disclosure.

The initial set of colors used in populating the cells 118 of the first color palette 106 may be predetermined or computed automatically. FIG. 2 is a table that illustrates one example of populating the first color palette 106 with colors automatically. FIG. 2 shows a set of first color component values 203, a set of second color component values 206, and a set of third color component values 209, with each value being an octet represented in binary.

FIG. 2 illustrates a scheme wherein the two most significant bits of each color component are varied within the first color palette 106 (FIG. 1), thereby providing 64 different color values that are well distributed in the color space. In other embodiments, the N most significant bits of each of the color components may be varied, where N is a predetermined positive integer that is less than a bit length of each color component value (e.g., less than eight). In some embodiments, the value of N may vary among the palettes. In this example, the RGB color space is used. Each cell 118 (FIG. 1) is assigned a corresponding red value from the set of red values 203, a corresponding green value from the set of green values 206, and a corresponding blue value from the set of blue values 209.

This color generation scheme is not intended to be limiting, as other bits of each color component may be varied instead. Moreover, the bits of one color component may be varied in a different way compared with another color component. In the color generation scheme of FIG. 2, the six least significant bits are marked with "XXXXXX." This may be replaced with any bit string as desired. For example, one embodiment might use "000000," and another embodiment might use "111111." Yet another embodiment might use "100000," which provides an average value of the white color set.

A user may select a cell 118 through mouse action (e.g., single click, double click, right click, scrolling, etc.), keyboard shortcut, keyboard navigation, or some other type of selection. The selected cell 118 may be distinguished via a box, shadow, highlighting, color, or in some other way relative to the other cells 118. When a user selects a cell 118 in the first color palette 106 having a color from the initial set of colors, the color selection application 103 (FIG. 1) may be configured to populate the second color palette 109 (FIG. 1) with a subsequent, or second, set of colors. In the example of FIG. 2, the color component values for a selected cell 212 are shown. The color component values for the selected cell 212 are "0b11XXXXXX" for red, "0b00XXXXXX" for green, and "0b10XXXXXX" for blue.

Figure 3:
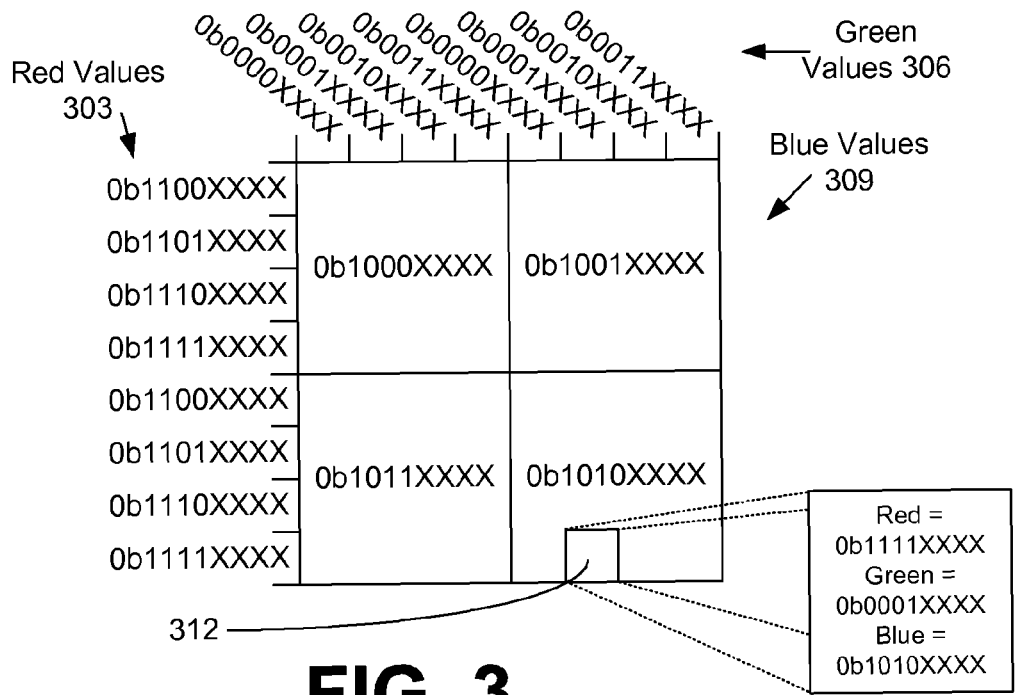

Turning now to FIG. 3, shown is a table that illustrates one example of populating the second color palette 109 (FIG. 1) with colors automatically after a color has been selected from the first color palette 106 (FIG. 1). FIG. 3 shows a set of red values 303, a set of green values 306, and a set of blue values 309, with each value being an octet represented in binary. In FIG. 3, the two most significant bits of each of the three color components have been determined according to the color selected from the first color palette 106 in the selected cell 212 (FIG. 2). For example, in the set of red values 303, the two most significant bits are "11"; in the set of green values 306, the two most significant bits are "00"; and in the set of blue values 309, the two most significant bits are "10." In other embodiments, the N most significant bits of each of the color components may be determined, where N is a predetermined positive integer that is less than a bit length of each color component value (e.g., less than eight).

In the embodiment of FIG. 3, the next two most significant bits after the first two are varied across the second color palette 109. The remaining four least significant bits are marked with "XXXX." This may be replaced with any bit string as desired. As non-limiting examples, one embodiment might use "0000," and another embodiment might use "1111." Yet another embodiment might use "1000," which provides an average value of the white color set. In the example of FIG. 3, the color component values for a selected cell 312 are shown. The color component values for the selected cell 312 are "0b1111XXXX" for red, "0b0001XXXX" for green, and "0b1010XXXX" for blue.

In an alternative embodiment employing floating point color component values between zero and one, the floating point values may be, for example, quantized to an integer value between zero and a maximum integer. Where the maximum integer is 256, the scheme discussed above relating to color component octets may be used. However, this example is not intended to be limiting and may be extended to other maximum integer values and other bit lengths for color component values.

Referring back to FIG. 1, after a color is selected in the second color palette 109, the third color palette 112 may be populated with a third set of colors selected according to the latest color selection. The first four most significant bits may be determined according to the latest color selection, and the next two most significant bits may be varied across the third color palette 112. The two least significant bits may be assigned to be a bit string such as, for example, "00," "11," or "10."

A color may then be selected in the third color palette 112 and used to determine a fourth set of colors for populating the fourth color palette 115. The first six most significant bits may be determined according to the latest color selection, and the two least significant bits may be varied across the fourth color palette 115. In one embodiment, by the time a color is selected by way of the fourth color palette 115, any color that is capable of representation using a 24-bit color space may be addressed. Consequently, by using a divide-and-conquer strategy, a user may only view, for example, 256 colors (64 times 4) instead of potentially examining over 16 million colors.

Although four color palettes 106, 109, 112, 115 are illustrated in FIG. 1, it is understood that a different number of palettes may be present in other embodiments. It may be the case that only two palettes are necessary due to a lack of color discrimination in the human eye. Further, the number of palettes and the sizes of the palettes may vary. The sizes of the cells 118 in pixels or other measures may be determined, for example, based on the capability of the human eye to distinguish adjacent colors. Moreover, although the four color palettes 106, 109, 112, 115 are shown in a clockwise sequence, in other embodiments the four color palettes 106, 109, 112, 115 may be arranged vertically, horizontally, diagonally, counter-clockwise, or in some other sequence. Additionally, each of the four color palettes 106, 109, 112, 115 may occupy varying sizes on a display. As a non-limiting example, the color palette 106, 109, 112, or 115 which is currently being examined by the user to choose a color may be rendered in a larger, more prominent display area for ease of color selection. Where a color palette 106, 109, 112, 115 is displayed on a touch screen, the width of a cell 118 may be defined, for example, relative to a width of a fingertip.

In one embodiment, a cascading set of the color palettes 106, 109, 112, 115 may be used. As a non-limiting example, the second color palette 109 may be initially hidden and be made visible when a color is selected on the first color palette 106. Similarly, the third color palette 112 may be initially hidden and be made visible when a color is selected on the second color palette 109, and the fourth color palette 115 may be initially hidden and be made visible when a color is selected on the third color palette 112. The initially hidden color palettes 109, 112, 115 may roll out in the user interface 100, replace a previous color palette 106, or be visibly presented in another manner. In one embodiment, the initially hidden color palettes 109, 112, 115 may be made visible by way of an animation or other transition to simulate a zooming function. As a non-limiting example, further zooming on a selected color in the color palette 106 may produce a larger subsequent color palette 109 with additional refinements to the selected color. Likewise, a zooming out function may be implemented to return to an earlier state, for example, as in the first color palette 106.

In some embodiments, subsequent sets of colors beyond the first set of colors may be predetermined. For example, a 64-color first set of colors for a first color palette 106 may be predetermined. Further, a respective 64-color second set of colors for the second color palette 109 for each of one or more of the 64 colors in the first set of colors may also be predetermined. Such sets of colors may be represented in a logical tree of colors. The nodes of the tree may be thought of as providing hints for subsequent color division.

The color selection application 103 may be configured such that users may be able to change their color selections for each of the palettes. For example, a user may select a different color in the first color palette 106, thereby prompting a different set of colors to be rendered in the second color palette 109. The remaining color palettes 112, 115 may remain the same or be updated to be invalidated, dimmed, grayed out, hidden, or any other state. Likewise, a user may select a different color in the second color palette 109, thereby prompting a different set of colors to be rendered in the third color palette 112. The remaining color palette 115 may remain the same or be updated to be invalidated, dimmed, grayed out, hidden, or any other state. Similarly, a user may select a different color in the third color palette 112, thereby prompting a different set of colors to be rendered in the fourth color palette 115.

When a color is selected, a color specification for that color may be rendered in the user interface 100. As a non-limiting example, a larger cell 118 containing the selected color may be rendered near the color palettes 106, 109, 112, 115. Color specifications and larger cells 118 may be rendered and/or determined for selected colors of each of the color palettes 106, 109, 112, 115. In one embodiment, the color specification for the latest selected color may be rendered.

The color specification may include information that may be used to reproduce that color in another application. For example, the color specification may include a binary, octal, decimal, hexadecimal, or other representation of the color value. Where the selected color is associated with a name, such as a color name supported by a browser, the name may be included in the color specification. In one embodiment, a color specification may be copied to a clipboard of the operating system so that the color specification may be pasted directly into another application. In one embodiment, a user may be able to click on a color and drag it into a tool of another application to select the same color in that application.

Figure 4:
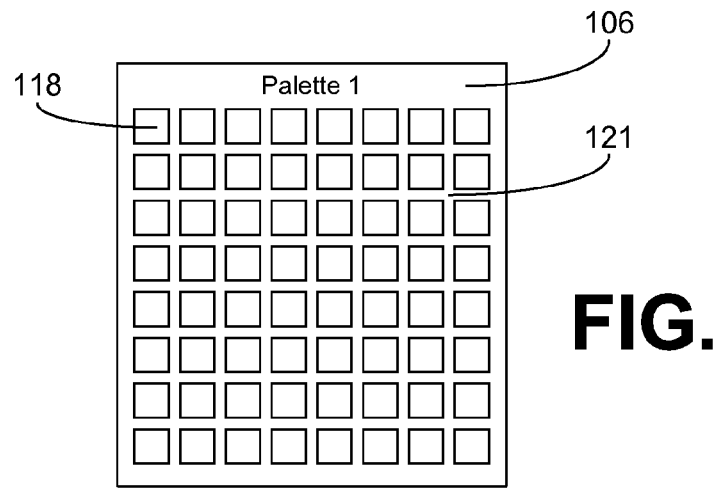
FIGS. 4-6 are drawings of other examples of user interfaces of the color selection application according to various embodiments of the present disclosure.

Referring next to FIG. 4, shown is another example of a color palette 106 that includes a plurality of cells 118 separated by an interstitial border 121 according to one embodiment. The interstitial border 121 shown in FIG. 4 is wider than the interstitial border 121 illustrated in FIG. 1. FIG. 4 provides one example demonstrating that the width of the interstitial border 121 may differ in various embodiments. In some embodiments, the width, color, and/or other attributes of the interstitial border 121 may differ and may be user configurable. In one embodiment, the interstitial border 121 may be transparent or have a transparent portion, thereby showing, for example, the background of the user interface 100 (FIG. 1) or another application underneath.

Figure 5:
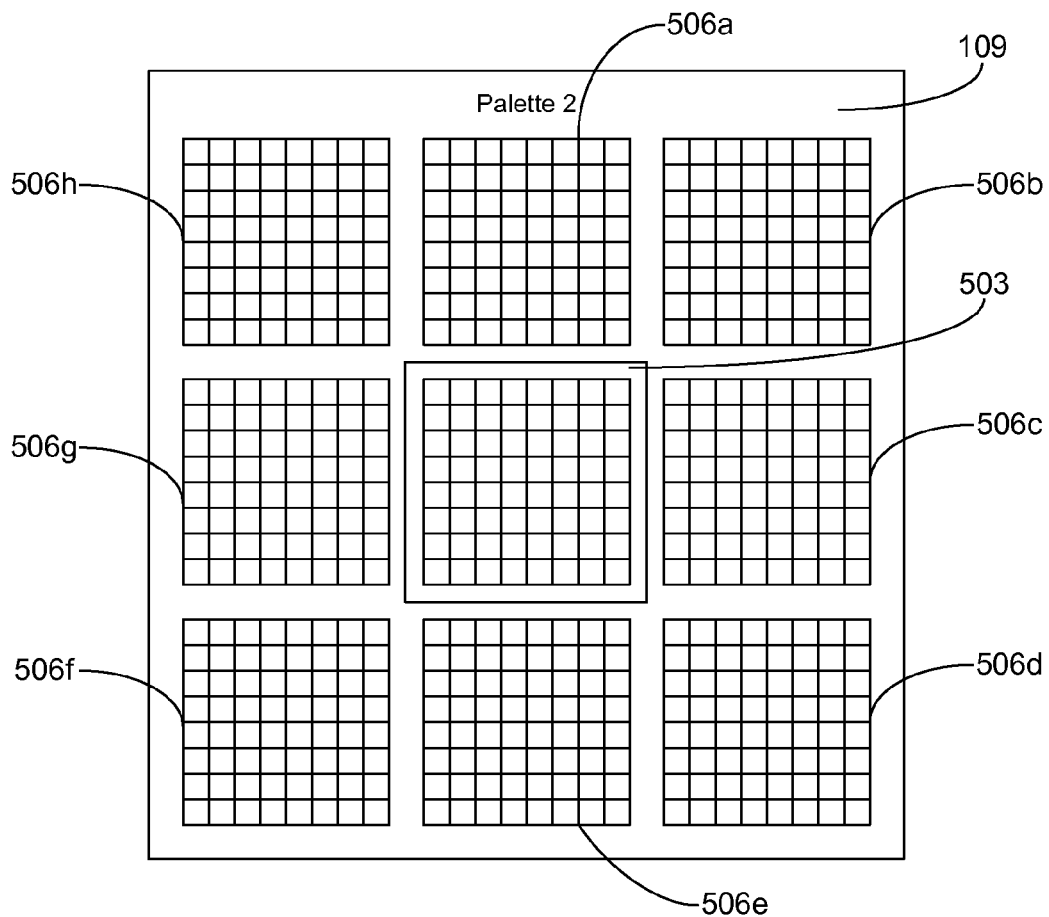

Moving on to FIG. 5, shown is another example of a color palette 109 according to one embodiment. The color palette 109 depicted in FIG. 5 is composed of a primary color palette 503 surrounded by a plurality of secondary color palettes 506. The primary color palette 503 may correspond to the contents of the second color palette 109 depicted in FIG. 1. The set of colors used for populating the primary color palette 503 may be determined from a color selection on a first color palette 106 (FIG. 1) as previously described. The primary color palette 503 may be distinguished via a box, shadow, highlighting, color, or in some other way relative to the secondary color palettes 506.

The secondary color palettes 506 shown in FIG. 5 may be populated according to respective neighboring sets of colors determined from colors that are adjacent to the selected color on the first color palette 106. In one embodiment, a neighboring set of colors rendered in a secondary color palette 506 is disjoint from the set of colors rendered in the primary color palette 503. As a non-limiting example, the set of colors used for the secondary color palette 506a, located above the primary color palette 503, may be determined from the set of colors that otherwise would have been determined had the cell 118 (FIG. 1) immediately above the selected cell 118 been selected. As another non-limiting example, the set of colors used for the secondary color palette 506b, located above and to the right of the primary color palette 503, may be determined from the set of colors that otherwise would have been determined had a cell 118 immediately above and to the right of the selected cell 118 been selected. The sets of colors used in the other secondary color palettes 506 may be determined in a similar manner.

The second color palette 109 depicted in FIG. 5 therefore enables a user to select a desired color from a wider variety of colors, which still may be defined by, or relative to, a previous color selection. In other words, if a user is dissatisfied with the choices in the primary color palette 503, it may not be necessary for the user to select a different nearby color cell 118, as the set of colors may already be represented within a secondary color palette 506. In one embodiment, where a selected cell 118 is at the edge of the first color palette 106, the color selection application 103 (FIG. 1) may wrap around the first color palette 106 in order to determine nearby colors from which to populate one or more of the secondary color palettes 506. In another embodiment, the secondary color palettes 506 may be populated according to the same approach as the primary color palette 503, thereby providing more color choices in the second color palette 109 than in the first color palette 106. In various embodiments, the secondary color palettes 506 may be indistinguishable from the primary color palette 503 with respect to borders and spacing.

Although the primary color palette 503 is depicted as surrounded by the secondary color palettes 506, it is understood that additional or fewer secondary color palettes 506 may be present in other embodiments. Further, the secondary color palette(s) 506 may be provided in different arrangements relative to the primary color palette 503 as desired. Although FIG. 5 provides an example of a second color palette 109 according to one embodiment, it is understood that similar modifications may be made to the color palettes 112, 115 as desired for additional color choices.

Figure 6:
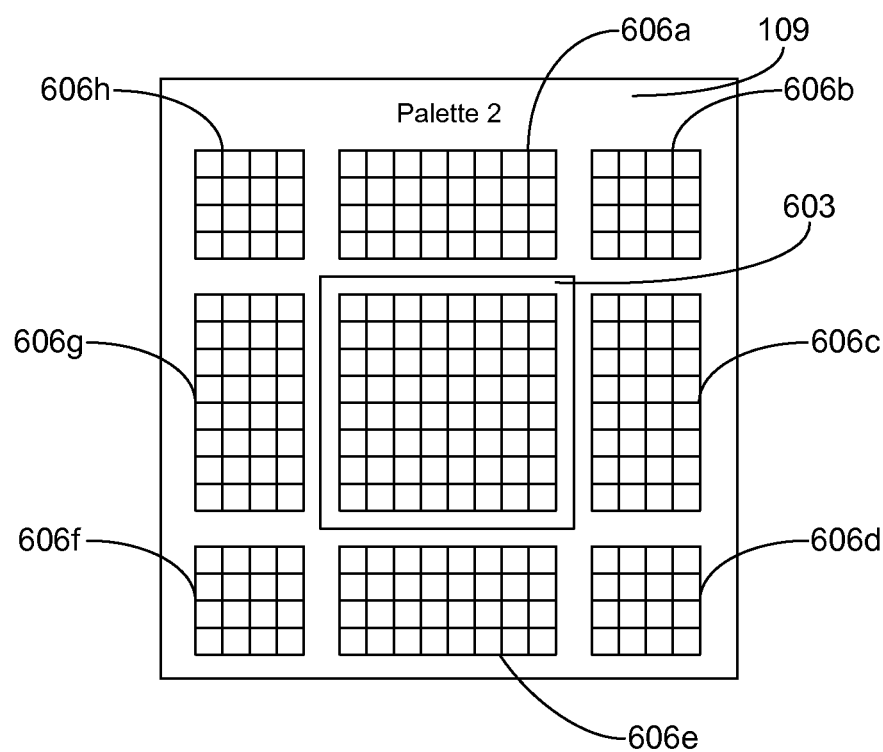

Referring next to FIG. 6, shown is yet another example of a color palette 109 according to one embodiment. The color palette 109 depicted in FIG. 6 is composed of a primary color palette 603 surrounded by a plurality of secondary color palettes 606. The primary color palette 603 may correspond to the contents of the second color palette 109 depicted in FIG. 1. The set of colors used for populating the primary color palette 603 may be determined from a color selection on a first color palette 106 (FIG. 1) as previously described. The primary color palette 603 may be distinguished via a box, shadow, highlighting, color, or in some other way relative to the secondary color palettes 606.

The secondary color palettes 606 shown in FIG. 6 may be populated according to respective neighboring sets of colors determined from colors that are adjacent to the selected color on the first color palette 106. In one embodiment, a neighboring set of colors rendered in a secondary color palette 606 is disjoint from the set of colors rendered in the primary color palette 603. By way of comparison with the secondary color palettes 506 (FIG. 5), the secondary color palettes 606 have fewer cells 118 (FIG. 1) than the primary color palette 603 and have a non-uniform number of cells 118. In other words, the secondary color palettes 606 may be truncated relative to the corresponding secondary color palettes 506.

The second color palette 109 depicted in FIG. 6 therefore enables a user to select a desired color from a wider variety of colors, though a smaller variety of colors than FIG. 5, which still may be defined by, or relative to, a previous color selection. In other words, if a user is dissatisfied with the choices in the primary color palette 603, it may not be necessary for the user to select a different nearby color cell 118, as the set of colors may already be represented within a secondary color palette 606. In one embodiment, where a selected cell 118 is at the edge of the first color palette 106, the color selection application 103 (FIG. 1) may wrap around the first color palette 106 in order to determine nearby colors from which to populate one or more of secondary color palettes 606.

Figure 7:
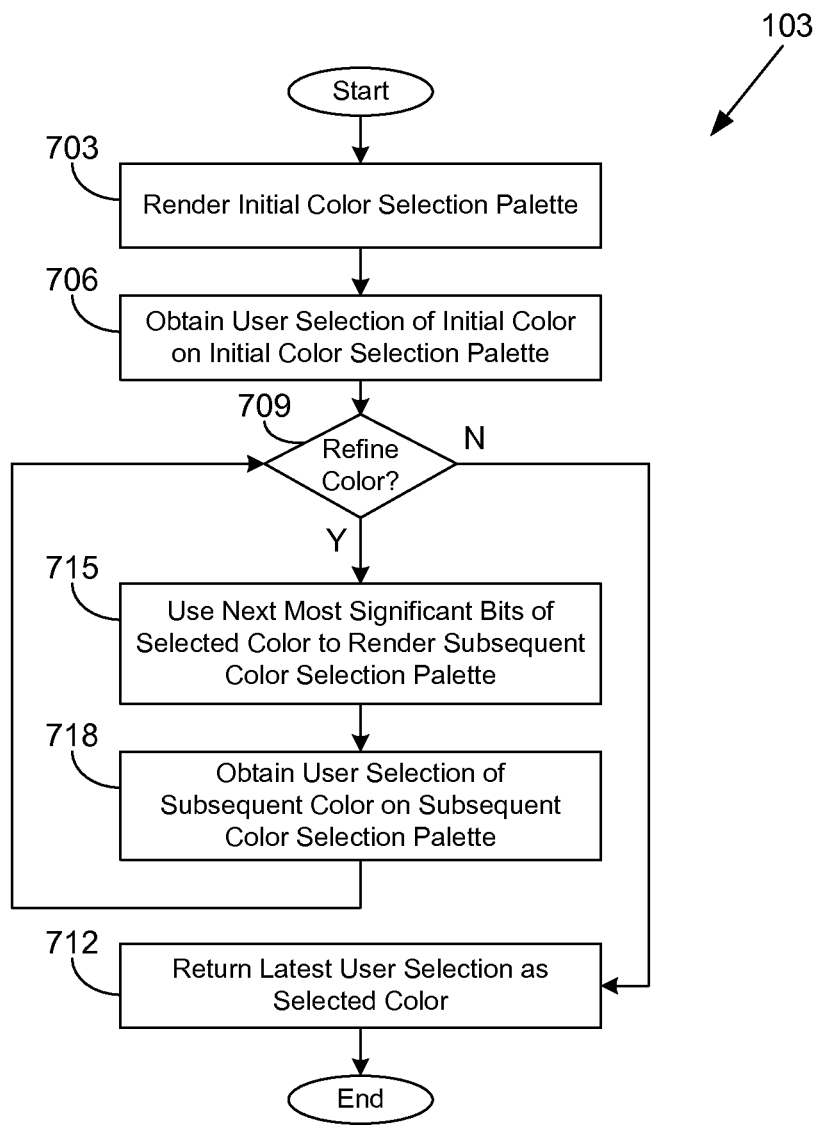
FIG. 7 is a flowchart illustrating one example of functionality implemented as portions of the color selection application according to various embodiments of the present disclosure.

Turning next to FIG. 7, shown is a flowchart that provides one example of the operation of a portion of the color selection application 103 according to various embodiments. It is understood that the flowchart of FIG. 7 provides merely an example of the many different types of functional arrangements that may be employed to implement the operation of the portion of the color selection application 103 as described herein. As an alternative, the flowchart of FIG. 7 may be viewed as depicting an example of steps of a method implemented in a computing device according to one or more embodiments.

Beginning with box 703, the color selection application 103 renders an initial color selection palette, such as the first color palette 106 illustrated in FIG. 1. In box 706, the color selection application 103 obtains a user selection of an initial color cell 118 (FIG. 1) on the initial color selection palette. In various embodiments, a user may select a cell 118 with a mouse, keyboard, and/or other input device.

Next, in box 709, the color selection application 103 determines whether the selected color is to be refined. For example, it may be the case that the user is satisfied with the color selection from the initial color palette 106 and no refinement is deemed necessary. If the color selection application 103 determines that no refinement is needed, the color selection application 103 proceeds to box 712 and returns the latest user selection of a color as the selected color. A color specification of the color may be rendered in a user interface 100 (FIG. 1) and/or the color specification may be copied to the system clipboard, if applicable. Thereafter, the portion of the color selection application 103 ends.

Otherwise, if the color selection application 103 determines in box 709 that further refinement is needed, the color selection application 103 proceeds to box 715 and uses the next most significant bits of the selected color to render a subsequent color palette 109 (FIG. 1) for selection. In one embodiment, the color selection application 103 uses the first two most significant bits, then the next two most significant bits, and so on in order to determine a set of colors to be used in populating the subsequent color palette 109 for selection.

In box 718, the color selection application 103 obtains a user selection of a subsequent color on a subsequent color palette 109 for color selection. This subsequently selected color may be a finally selected color or may be further refined. To this end, the color selection application 103 returns to box 709 and determines whether the latest selected color is to be further refined. If desired by the user, in some embodiments the color may be refined multiple times until any one of the colors in the color space may have been addressed through a series of selections. Further, a user may choose to change a previous color selection, which may lead to additional refinements of the replacement color selection. Ultimately, a color is finally selected and the portion of the color selection application 103 ends.

Figure 8:
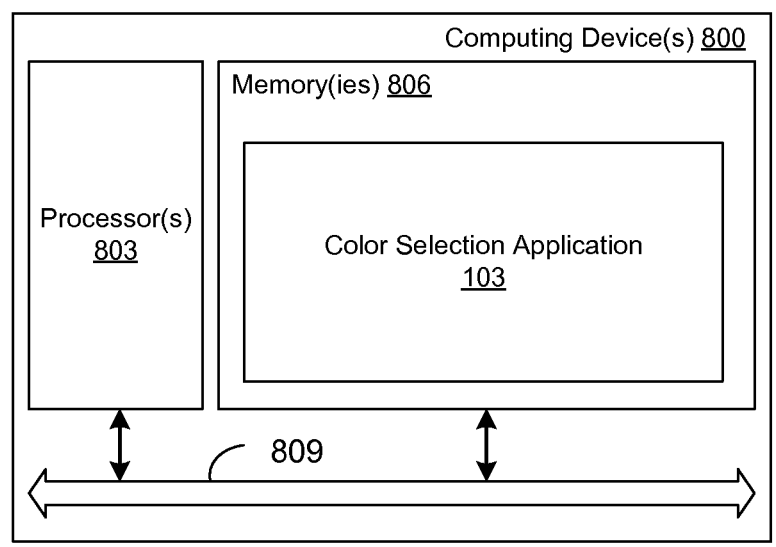
FIG. 8 is a schematic block diagram that provides one example illustration of a computing device employed to execute the color selection application according to various embodiments of the present disclosure.

With reference to FIG. 8, shown is a schematic block diagram of a computing device 800 according to an embodiment of the present disclosure. The computing device 800 includes at least one processor circuit, for example, having a processor 803 and a memory 806, both of which are coupled to a local interface 809. To this end, the computing device 800 may comprise, for example, at least one server computer or like device. Alternatively, the computing device 800 may be embodied in the form of a desktop computer, a laptop computer, a personal digital assistant, a cellular telephone, set-top box, music players, web pads, tablet computer systems, or other devices with like capability. The local interface 809 may comprise, for example, a data bus with an accompanying address/control bus or other bus structure as can be appreciated.

A plurality of computing devices 800 may be employed that are arranged, for example, in one or more server banks or computer banks or other arrangements. For example, a plurality of computing devices 800 together may comprise, for example, a cloud computing resource, a grid computing resource, and/or any other distributed computing arrangement. Such computing devices 800 may be located in a single installation or may be dispersed among many different geographical locations. For purposes of convenience, the computing device 800 is referred to herein in the singular. Even though the computing device is referred to in the singular, it is understood that a plurality of computing devices 800 may be employed in the various arrangements as described above.

Stored in the memory 806 are both data and several components that are executable by the processor 803. In particular, stored in the memory 806 and executable by the processor 803 are the color selection application 103 and potentially other applications. Also stored in the memory 806 may be a data store and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803.

Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the color selection application 103 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the color selection application 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the color selection application, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that renders a first set of colors from a color space in a first color palette of a user interface, each color from the color space being expressed as a three-tuple of color component octets;
   code that obtains a selection of one of the first set of colors;
   code that renders a second set of colors from the color space in a second palette of the user interface, the second set of colors being determined according to values of the two most significant bits of each of the corresponding color component octets of the one of the first set of colors;
   code that obtains a selection of one of the second set of colors;
   code that renders a third set of colors from the color space in a third palette of the user interface, the third set of colors being determined according to values of the four most significant bits of each of the corresponding color component octets of the one of the second set of colors;
   code that obtains a selection of one of the third set of colors;
   code that renders a fourth set of colors from the color space in a fourth palette of the user interface, the fourth set of colors being determined according to values of the six most significant bits of each of the corresponding color component octets of the one of the third set of colors; and
   wherein each set of colors has the same number of colors.

2. The computer-readable medium of claim 1, wherein the six least significant bits of the color component octets of the first set of colors are assigned to be "1 0 0 0 0 0," the four least significant bits of the color component octets of the second set of colors are assigned to be "1 0 0 0," and the two least significant bits of the color component octets of the third set of colors are assigned to be "1 0."

3. The computer-readable medium of claim 1, wherein the program further comprises:
   code that obtains a selection of one of the fourth set of colors; and
   code that renders a color specification for the one of the fourth set of colors in the user interface.

4. A system, comprising:
   at least one computing device; and
   a color selection application executable in the at least one computing device, the color selection application comprising:
      logic that renders an initial set of colors from a color space in a user interface, each color from the color space being expressed as a respective tuple of color component values;
      logic that obtains a selection of one of the initial set of colors; and
      logic that renders a subsequent set of colors from the color space in the user interface, the subsequent set of colors being determined according to values of the N most significant bits of each of the corresponding color component values of the one of the initial set of colors, N being a predetermined positive integer that is less than a bit length of each color component value.

5. The system of claim 4, wherein the subsequent set of colors has at least as many colors as the initial set of colors.

6. The system of claim 4, wherein the initial set of colors is predetermined.

7. The system of claim 6, wherein the logic that renders the subsequent set of colors is configured to use a predetermined subsequent set of colors as the subsequent set of colors for at least one of the initial set of colors.

8. The system of claim 4, wherein the color space comprises the red, green, blue (RGB) color space; each tuple of color component values comprises a red color component value, a blue color component value, and a green color component value; and the bit length of each color component value is eight bits.

9. The system of claim 4, wherein the N most significant bits of each color component value from the subsequent set of colors are assigned to be the values of the N most significant bits of the corresponding color component value of the one of the initial set of colors.

10. The system of claim 9, wherein the next most significant bit following the N most significant bits of each component value from the subsequent set of colors is assigned to be one and any subsequent bits are assigned to be zero.

11. The system of claim 4, wherein the color selection application further comprises:
    logic that obtains a selection of one of the subsequent set of colors; and
    logic that renders a color specification for the one of the subsequent set of colors in the user interface.

12. The system of claim 4, wherein each color is rendered in the user interface in a discrete cell with an interstitial border.

13. The system of claim 12, wherein at least one attribute of the interstitial border is user configurable.

14. The system of claim 4, wherein the user interface comprises a plurality of color palettes, the initial set of colors is rendered in a first one of the color palettes, and the subsequent set of colors is rendered in a second one of the color palettes.

15. The system of claim 14, wherein N is two, and each of the color palettes has 64 discrete cells.

16. The system of claim 14, wherein N equals the bit length of each color component value divided by the number of color palettes.

17. The system of claim 14, wherein a number of colors rendered in each of the color palettes is given by the equation: $|C_{GRID}|=|C_{SPACE}|^{1/G}$, wherein $|C_{GRID}|$ is the number of colors rendered in each of the color palettes, $|C_{SPACE}|$ is the number of colors in the color space, and G is the number of color palettes.

18. A method, comprising the steps of:
    providing, in at least one computing device, an initial set of colors from a color space for rendering in a user interface, each color from the color space being expressed as a respective tuple of color component values;
    obtaining, in the at least one computing device, a selection of one of the initial set of colors; and
    generating, in the at least one computing device, a subsequent set of colors from the color space for rendering in the user interface, the subsequent set of colors being determined according to values of the N most significant bits of each of the corresponding color component values of the one of the initial set of colors, N being a predetermined positive integer that is less than a bit length of each color component value.

19. The method of claim 18, wherein the subsequent set of colors has at least as many colors as the initial set of colors.

20. The method of claim 18, further comprising the step of indicating, in the at least one computing device, a color specification for the one of the initial set of colors in the user interface.

21. The method of claim 18, wherein the color space comprises a hue, saturation, value (HSV) color space.

22. The method of claim 18, further comprising the steps of:
- rendering, in the at least one computing device, the initial set of colors in a first palette of colors;
- rendering, in the at least one computing device, the subsequent set of colors in a second palette of colors; and
- wherein each color is discretely represented in a color cell.

23. The method of claim 22, wherein the first palette of colors and the second palette of colors each comprise a respective grid of color cells.

24. The method of claim 22, wherein a neighboring set of colors from the color space and the subsequent set of colors are rendered in the second palette of colors.

25. The method of claim 24, wherein the neighboring set of colors is disjoint from the subsequent set of colors.

26. The method of claim 18, wherein the N most significant bits of each color component value from the subsequent set of colors are assigned to be the values of the N most significant bits of the corresponding color component value of the one of the initial set of colors.

\* \* \* \* \*